(12) United States Patent
Anglin et al.

(10) Patent No.: US 7,752,575 B2
(45) Date of Patent: Jul. 6, 2010

(54) ATTACHMENT ACTIVATION IN SCREEN CAPTURES

(75) Inventors: Debbie Ann Anglin, Austin, TX (US);
Howard Neil Anglin, Austin, TX (US);
Nyralin Novella Kline, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 11/671,552

(22) Filed: Feb. 6, 2007

(65) Prior Publication Data

US 2008/0189648 A1 Aug. 7, 2008

(51) Int. Cl.
*G06F 13/00* (2006.01)
*G06F 15/00* (2006.01)
(52) U.S. Cl. ...................... 715/853; 715/765
(58) Field of Classification Search ......... 715/762–765, 715/852–855, 740–743, 840; 345/549, 416
See application file for complete search history.

(56) References Cited

U.S. PATENT DOCUMENTS

| 5,973,692 A | 10/1999 | Knowlton et al. |
| 2007/0143736 A1* | 6/2007 | Moriarty et al. ............. 717/100 |
| 2007/0211071 A1* | 9/2007 | Slotznick et al. ............ 345/594 |
| 2008/0097984 A1* | 4/2008 | Candelore ...................... 707/5 |
| 2008/0098433 A1* | 4/2008 | Hardacker et al. ............ 725/52 |

FOREIGN PATENT DOCUMENTS

| EP | 1235158 A1 | 8/2002 |
| WO | 0207833 A1 | 1/2002 |

OTHER PUBLICATIONS

"SNAGIT" TechSmith, pp. 1.2, retrieved Nov. 24, 2006 http://www.techsmith.com/snagit.asp?CMP=KgoogleStm.
Baldwin et al., "Overlay Mechanism for Annotating Sharing and Remote Window-Control", IBM Technical Disclosure Bulletin, vol. 36, No. 6A, Jun. 1983, pp. 407-410.
TECHSMITH Corp., "Snagit Online Help Guide—Version 8.1", Internet Citation, Aug. 23, 2006, pp. 11, 18, 21, 28, 58-62, 64, 77, 80, 83, 124, 136, 146, 201-202, 234, URL:http://web.archive.org/web/20060823234443/http://download.techsmith.com/snagit/docs/onlinehelp/enu/snagit_help.pdf>.

* cited by examiner

*Primary Examiner*—Cao "Kevin" Nguyen
(74) *Attorney, Agent, or Firm*—Yee & Associates, P.C.; Matthew W. Baca (57) ABSTRACT

A computer implemented method, apparatus, and computer program product for accessing information in screen captures. The process copies an image displayed on a display to form a screen capture. Next, the process receives a selection of an attachment image in the screen capture. Finally, the process links a document to the attachment image to form a file attachment overlay.

35 Claims, 5 Drawing Sheets

SCREEN CAPTURE
400

*FIG. 4*

R3H3 Compliance

File  Edit  View  Create  Actions  Attachment  Help

Address [                    ▼]  ⇦▾  ⇨▾

| Welcome | Application ✕ | Change – Inbox ✕ | Databases ✕ | Notify |

Case  Document  Print  Mail  ?????  View  Edit  ?????

| Series | TBD Analysis | PN_Count | Non Com |
|---|---|---|---|
| Z_Series | [402] Z_Series_TBD_parent_pn_Detail-20060208.xls | 11 | Z_Series_Non |
| Storage_Tape | [404] Storage_Tape_TBD_parent_pn_detail-20060208.xls | 116 | Storage_Tap |
| Storage_DASD | [406] Storage_DASD_TBD_parent_pn_detail-20060208.xls | 69 | Storage_DAS |
| IP_Series | [408] IP_Series_TBD_parent_PN-20060208.xls | 216 | IP_Series_TB |
| RSS | [410] RSS_TBD_parent_pn_Details-20060208.xls | 2083 | RSS_TBD_pa |
| X_Series | [412] X_Series_TBD_parent_pn_Details-20060208.xls | 272 | X_Series_TB |
| PSD | [414] PSD_Series_TBD_parent_pn_Details-20060208.xls | 476 | PSD_Series_ |
| Squadrons_H | | | |
| Squadrons_H | | | |
| E&TB_Smimm | | | |
| RSS_NT_4B45 | [416] RSS_NT_4B45_TBD_Parent_PN-20060208.xls | 510 | RSS_NT_4B45 |

February 00, 2010    Blue – Positive Change    Red – Negative Change

ATTACHMENT ACTIVATION IN SCREEN CAPTURES

BACKGROUND OF THE INVENTION

1. Field of the Invention

The present application is related generally to a data processing system and in particular to a method and apparatus for capturing data. More particularly, the present application is directed to a computer implemented method, apparatus, and computer usable program code for enabling links and attachments within a screen capture to be active and accessible.

2. Description of the Related Art

A screen capture image is an image or copy of the contents of an output display, such as a monitor, digital camera display screen, or any other output display. In other words, a screen capture is a picture, image, or graphic representation of the output a user would see when a web page, digital image, document, or other content is displayed by an application. A screen capture may also be referred to as a screen shot or a screen dump.

A user can create a screen capture by displaying a document or page that a user wants to copy, selecting a screen capture option, such as by selecting a "print screen" function, and saving the copied screen capture into a document file. The user can then send the screen capture to a recipient. The recipient can view the screen capture to see exactly what was on the user's screen when the user created the screen capture.

Today, users send screen captures via email and as attachments for presentations, instruction, demonstrations, tutorials, record keeping, and many other purposes. For example, applications frequently provide screen capture images in a tutorial to teach a user how to utilize the application. A user can view screen captures that show a user how various menus and tool bars appear when displayed and steps in implementing various functions of the application. In another example, if a web page designer wants to demonstrate a functionality of a new web page design to a customer, the user can send the customer screen captures of the new web page design before the web page is active and available online. If the new web page design included links to other web pages, the screen capture image, which is an exact copy of the output display, would also include images of the links.

However, a screen capture only serves as a visual display. The links in a screen capture image are only images or copies of the actual links in the web page and are typically not active, functional links and attachments. For example, if the screen capture is an image of a web page for movie reviews that includes links to local movie theaters, a user can select a link in the original web page display to retrieve the linked movie theater web page and display the selected movie theater's linked content to the user. However, if a user attempts to select the same link in a screen capture of the web page for movie reviews, the linked content for the selected link will not be displayed because the link in the screen capture is not a functional link itself.

Similarly, if a user creates a screen capture of a web page having attached documents and linked document pages, the screen capture image will include images of the attached document icons and links that appear identical to the icons and links in the original web page. If the user selects an icon representing an attached document or a link for a linked document in the original web page, the attached document is retrieved by the user's web browser and displayed. However, if the user attempts to select the icon representing the attached or linked document in the screen capture, the attached or linked document will not be retrieved because links and file attachments in current screen captures are typically not active and functional links and document attachments.

Currently, if a user wants to view linked content or an attached document shown in a screen capture image, the user cannot retrieve the linked content or attached document using the screen capture image. The user would have to request a copy of the linked content or attached document from the person that created the screen capture and/or from any other person that may have access to the desired content. In some cases, the user may be unable to obtain the linked or attached content. Moreover, even if the user is able to obtain the linked or attached content upon request, current methods of requesting desired linked or attached content is inefficient, inconvenient, burdensome, and unreliable.

SUMMARY OF THE INVENTION

The illustrative embodiments provide a computer implemented method, apparatus, and computer usable program code for accessing information in screen captures. The process copies an image displayed on a display to form a screen capture. Next, the process receives a selection of an attachment image in the screen capture. Finally, the process links a document to the attachment image to form a file attachment overlay. The file attachment overlay is superimposed over the attachment image in the screen capture.

In one embodiment, the attachment image is an image of a hyperlink and the file attachment overlay is an active hyperlink that overlays the image of the hyperlink. The process retrieves a linked web page corresponding to the active hyperlink and displaying the linked web page in a web browser on the client in response to receiving a selection of the file attachment overlay at a client.

In another embodiment, the process may generate an active file attachment icon in the screen capture to represent the file attachment overlay, wherein the active file attachment icon includes a different visual characteristic than the original attachment image. The different visual characteristic distinguishes the active file attachment icon for the file attachment overlay from an inactive attachment image. The different visual characteristic may include at least one of a color, a shape, a flag, a border, a symbol, a size, a set of dimensions, and a thumbnail.

In another embodiment, the file attachment overlay may be, for example, an active and accessible file attachment link. A user can view a document by selecting the file attachment overlay. The process sends the screen capture with the file attachment overlay to a recipient by means of an email application. In another embodiment, the process embeds the file attachment overlay directly into the body of an email message.

The illustrative embodiments also provide a computer implemented method, apparatus, and computer usable program code for link activation in screen captures. In this embodiment, the process copies an image to form a screen capture. Next, the process receives a selection of a link image in the screen capture. The process adds an active hyperlink to the screen capture to form a link overlay. The link overlay is an active hyperlink that overlays the link image in the screen capture. The process displays the document in response to receiving a selection of the file attachment overlay in the screen capture.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
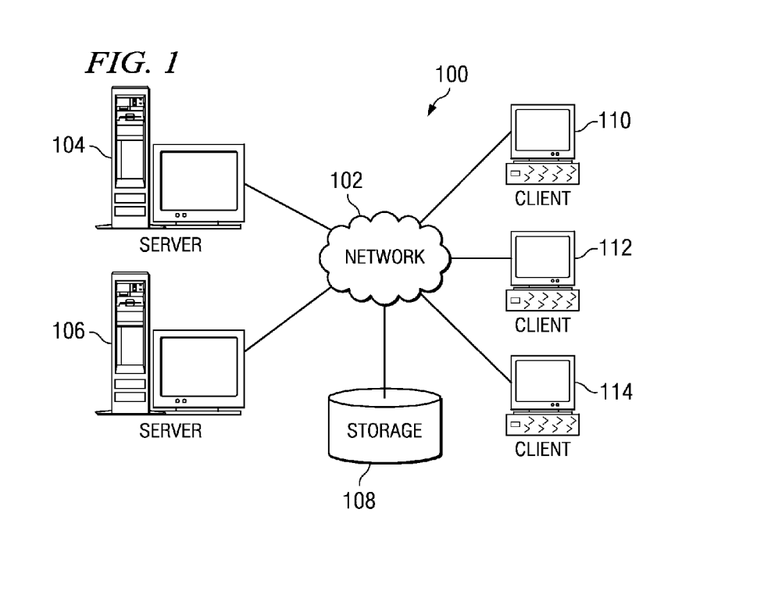
FIG. 1 is a pictorial representation of a network of data processing systems in which illustrative embodiments may be implemented.
Figure 2:
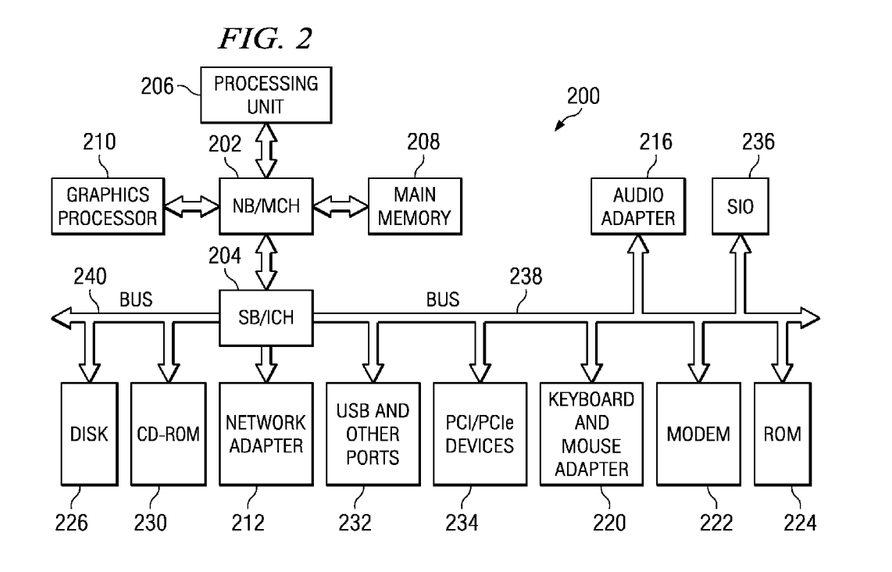
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java® programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method, apparatus, and computer usable program code for attachment activation in screen captures. The process copies an image to form a screen capture. The process receives a selection of an attachment image in the screen capture. An attachment image is an image or picture of an attachment icon. The attachment image in the screen capture is not a functional attachment icon. In other words, if a user selects or clicks on the attachment image, an attachment document will not be retrieved or displayed. In contrast, if a user selects or uses a mouse to double click on an attachment icon in a web page or document, an attached document will be retrieved and displayed.

The process links a document to the attachment image in the screen capture to form a file attachment overlay. The file attachment overlay is superimposed over the attachment image in the screen capture.

In another embodiment, the process receives a selection of a link image in the screen capture. The process adds an active hyperlink to the screen capture to form a link overlay. The link overlay is an active hyperlink that overlays the link image in the screen capture.

Figure 3:
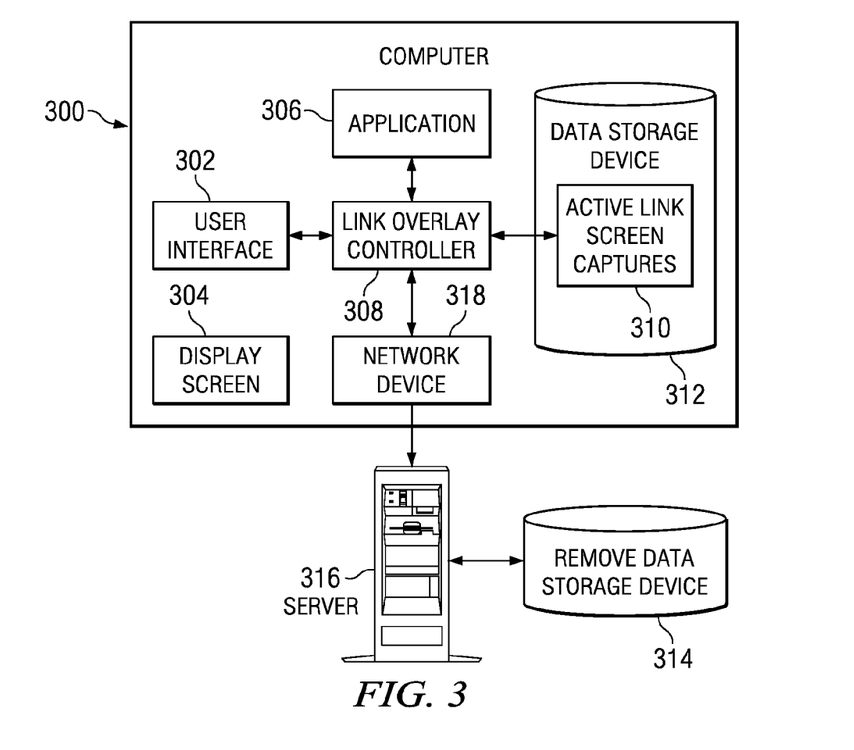
FIG. 3 is a block diagram illustrating a dataflow when an active file attachment overlay and/or a link overlay is created in a screen capture image in accordance with an illustrative embodiment.

FIG. 3 is a block diagram illustrating a dataflow when an active file attachment overlay and/or a link overlay is created in a screen capture image in accordance with an illustrative embodiment. Computer 300 may be implemented using any type of computing device, such as a personal computer, laptop, personal digital assistant, or any other computing device depicted in FIGS. 1 and 2.

Interface 302 is any type of known or available interface for providing input to computer 300 and receiving output from computer 300, including but not limited to, a graphical user interface (GUI), a menu-driven interface, and/or a command line interface. Interface 302 can also include, for example, a monitor or display device, an alphanumeric keyboard, a mouse, a touch screen, a voice recognition system, and/or any other known or available devices to enable a user to provide input to computer 300 and receive output from computer 300.

Display screen 304 is a monitor, laptop display, PDA display, touch screen display, liquid crystal display (LCD) screen, or any other type of known or available output display device for presenting graphical output to a user. In this example, display screen 304 is depicted as a separate component from user interface 302. However, in another embodiment, display screen 304 can be included within the same component as user interface 302.

Application 306 is any type of application software, including but not limited to, a word document, a web browser, an email application, an instant messaging application, a spread sheet, portable document format (PDF) reader, and/or any other type of application software.

Link overlay controller 308 is a software component for receiving a user's selection of an attachment image or link image in a screen capture, receiving a selection of a document or active hypertext link, and generating a file attachment overlay and/or a link overlay in the screen capture.

Active link screen captures 310 is a set of one or more screen captures having active hyperlinks added to the screen capture as a link overlay. In another embodiment, active link screen captures 310 is a set of one or more screen captures having an active document attached as a file attachment overlay to the screen capture. In another example, active link screen captures 310 is a set of one or more screen captures having both link overlays and file attachment overlays.

Active link screen captures 310 are stored in data storage device 312 for later retrieval by a user. Data storage device 312 is any type of known or available device for storing information on or locally to computer 300. Data storage device 312 is a data storage device, such as storage 108 in FIG. 1. Data storage device 312 can include a hard drive, flash memory, floppy disk storage, read only memory (ROM), random access memory (RAM), and/or non-volatile random access memory (NVRAM).

Server 316 is any type of server, such as server 104 and 106 in FIG. 1. Server 316 can be a server on a network, such as network 102 described in FIG. 1. Computer 300 accesses remote data storage device 314 on server 316 through a network connection via network device 318. Remote data storage device 314 is a data storage device such as data storage device 312 located remotely to computer 300.

Network device 318 is any type of network access software known or available for allowing computer 300 to access a network. Network device 318 connects to a network connection, such as network 102 in FIG. 1. The network connection permits access to any type of network, such as a local area network (LAN), a wide area network (WAN), or the Internet.

Thus, in this illustrative embodiment, a user utilizing application 306 at computer 300 uses a screen capture feature to create a screen capture of output displayed on display screen 304. For example, if application 306 is a web browser, the user can create a screen capture of a web page displayed by the web browser. In another example, if a user is viewing a document through a document reader application, the user can create a screen capture of the entire document or any portion of the document. The user selects to create the screen capture through user interface 302.

Link overlay controller 308 provides the user with a link overlay menu option in response to a user indicating a desire to create a link overlay and/or a file attachment overlay. A link overlay is an active hyperlink that is positioned over or superimposed on an inactive link image in a screen capture. A file attachment overlay is an active or functional file attachment that is positioned over or superimposed on an inactive file attachment image in a screen capture. Thus, when a link overlay or file attachment overlay is created in a screen capture, the user sees the active link overlay icon or the active file attachment icon rather than the original inactive link image and/or file attachment image.

Figure 4:
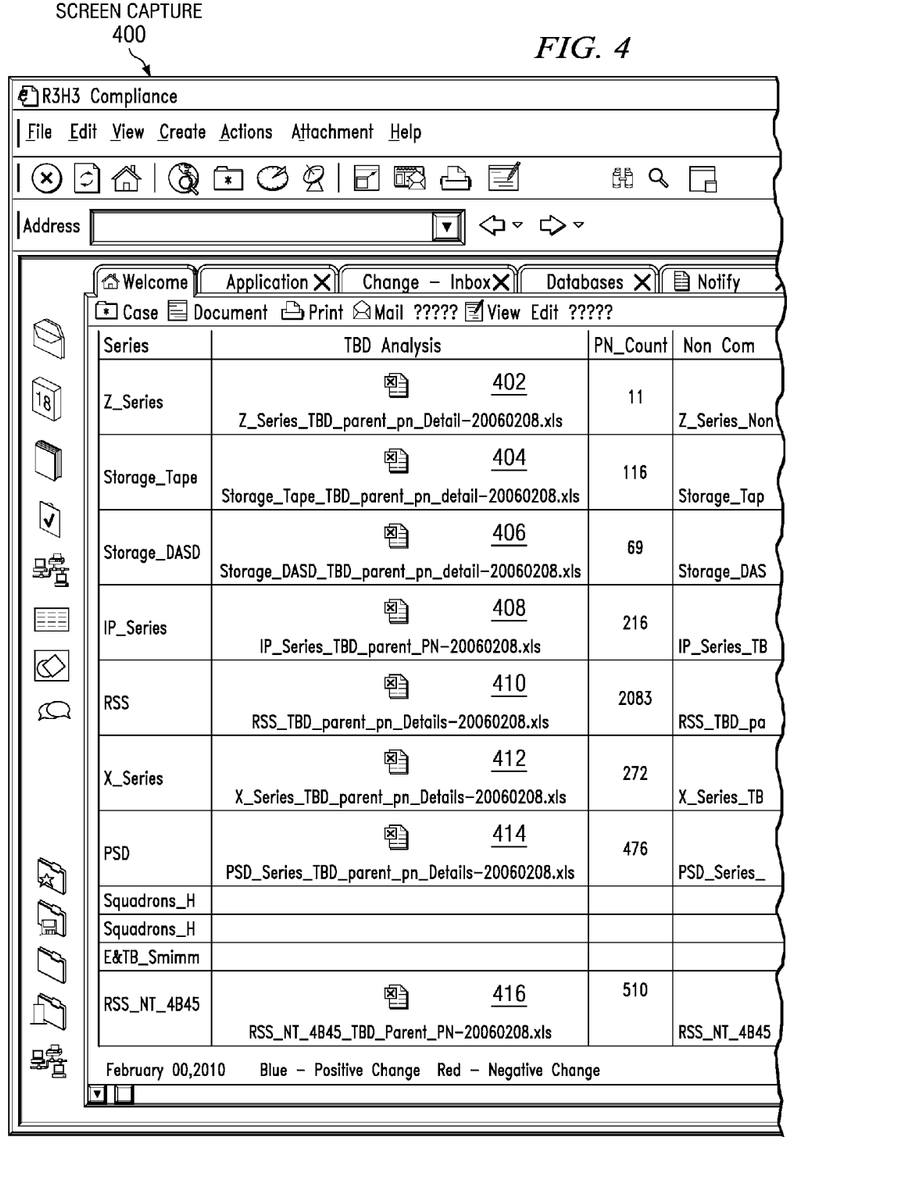
FIG. 4 is a block diagram illustrating a screen capture with link overlays in accordance with an illustrative embodiment.

A user can indicate a desire to create a link overlay and/or a file attachment overlay by highlighting, selecting, or clicking on the inactive link image or the inactive file attachment image in the screen capture. For example, a user can select a link image by clicking on the link with a mouse pointer. In another embodiment, a user indicates a desire to create a link overlay and/or a file attachment overlay by entering a command at a command line interface or selecting a link overlay menu option from a menu driven interface. In response to the user indicating a desire to create a link overlay and/or a file attachment overlay, link overlay controller 308 displays a link overlay menu in a new window on display screen 304. An example of a link overlay menu is shown in FIG. 4 as described below.

A user can use link overlay menu to enter an active hyperlink address and/or select a document for attachment. As used herein, a document for attachment can include, but is not limited to, a document file, a web page, a screen capture, a graphics file, a sound file, a wave file, a moving video file, a still video image file, a portable document format (PDF) document, an hypertext markup language (HTML) document, an extensible markup language (XML) document, a scrolling window, or any other text, audio, graphics, or media files, as well as any portion, part, or excerpt from a text, audio, graphics, or media file. For example, a document could include an entire journal article in a PDF file or only a selected portion of the journal article. Likewise, a document could include an entire web page or only a part of the web page. Thus, a user can choose to imbed a document, page, file, or even another screen capture in the first screen capture.

In response to receiving an active hyperlink from a user, link overlay controller 308 creates a link overlay. Link overlay controller 308 superimposes the link overlay over the selected link image in the screen capture. Link overlay controller 308 generates an active link overlay icon representing the link overlay. Thus, when a user views the screen capture image, the user only sees the active link overlay icon superimposed over the link image. However, in accordance with one illustrative embodiment, the active link overlay icon is an identical icon or image as the inactive link image. Therefore, the screen capture looks the same after a link overlay or file attachment overlay is added as the screen capture looked before the link overlay or file attachment icon was added.

In another embodiment, the active link overlay icon includes a different visual characteristic than the original link image. The different visual characteristic distinguishes the active link icon for the file attachment overlay from an inactive link image in the screen capture. For example, the different visual characteristic includes at least one of a color, a shape, a shading, cross hatching, a size, a set of dimensions, a flag, a border, a symbol, and a thumbnail. In another example, a different visual characteristic can include a flashing icon or an animated icon.

Thus, if the original inactive link image was a blue link address, the active link overlay icon could include the blue link address and a thumbnail image of a box having the word active inside the box. This active link overlay icon indicates to the user that the link is not just an inactive link image, but the link is an active link overlay that can be used to retrieve display content linked to the screen capture.

Likewise, in response to receiving a selection of an attachment file from a user, link overlay controller 308 creates a file attachment overlay. Link overlay controller 308 superimposes the file attachment overlay over the selected inactive file attachment image in the screen capture. Link overlay controller 308 generates an active file attachment overlay icon representing the file attachment overlay. In one embodiment, a file attachment overlay icon appears identical to the inactive file attachment image in the screen capture.

In another embodiment, the active file attachment overlay icon includes a different visual characteristic than the original file attachment image, and wherein the different visual characteristic distinguishes the active file attachment icon for the file attachment overlay from an inactive attachment image. For example, the different visual characteristic includes at least one of a color, a shape, a flag, a border, a symbol, a size or dimensions, and a thumbnail image. In other words, if the original inactive file attachment image was a box with a letter "W" inside it, the active link overlay icon could include the box with the letter "W" inside and a red checkmark next to the box indicating that the file attachment is an active file attachment overlay that can be used to retrieve and display a document attached to the screen capture. In another example, the file attachment image can be highlighted or enlarged to indicate that the file attachment is an active file attachment overlay.

A user can save the screen capture with the link overlay and/or file attachment overlay as active link screen captures 310 in data storage device 312 or in remote data storage device 314. When a user selects the active link overlay, link overlay controller 308 retrieves the linked web page from server 316 and displays the linked web page on display screen 304.

Thus, link overlay controller 308 captures exactly what a user sees on display screen 304 to form a screen capture. Link overlay controller 308 embeds an attached document or active hyperlink directly into the body of the screen capture. The user can send the screen capture to a recipient in an email application. A recipient could include a colleague, a technical support person, or even a friend.

In another embodiment, link overlay controller 308 displays information to a user on display screen 304 regarding an attachment document. Information regarding an attachment document includes, but is not limited to, a size of the document, a date the document was created, a time the document was created, an owner of the document, or any other information regarding a document. A user can display information regarding a document to make a determination as to whether to add the document as a file attachment overlay or remove a file attachment overlay for the document. For example, if the document is too large or consumes too much storage space in a data storage device, a user may choose to remove the file attachment overlay or choose not to add the document as a file attachment overlay to a screen capture.

In this example, link overlay controller 308 is a stand alone component. However, in another embodiment, link overlay controller 308 may be a component within application 306. For example, link overlay controller 308 could be part of an email application or a web browser application.

Turning now to FIG. 4, a block diagram illustrating a screen capture with link overlays is shown in accordance with an illustrative embodiment. Screen capture 400 is a screen capture of a restriction of hazardous substances (ROHS) compliance document page. This screen capture may be processed in computer 300 in FIG. 3. Screen capture 400 includes active file attachment icons 402-408. Active file attachment icons are icons that include a different visual characteristic than inactive file attachment images 410-416 that indicate that file attachment images 402-408 are file attachment overlays. In this example, active file attachment icons 402-408 include a checkmark next to the file attachment graphic indicating an active file attachment link. However, the file attachment overlay icon could include any type of different visual characteristic to distinguish an active file attachment from an inactive file attachment.

In one embodiment, the user has an option to move an active file attachment icon and active link icons to a different location on screen capture 400. A user can use a mouse, or other user interface, to move or adjust the location of the active file attachment icon to ensure the active file attachment icon covers or completely overlays the attachment image. The user can also change the dimensions or size of the file attachment icon. Likewise, a user can move or adjust the location of an active link icon. The user can also change the dimensions or size of the active link icon. For example, if an active link icon is not completely superimposed over the hyperlink image in the screen capture, the user can use a mouse to drag and drop the active link icon to completely cover the hyperlink image.

In another embodiment, a user can select an active file attachment icon from a set of active file attachment icons. Likewise, a user can select an active link icon from a set of active link icons. A user may wish to select an active file attachment icon because some applications use different images for file attachments. For example, a word document attachment image may look different than a lotus notes file attachment image or a google mail file attachment image. Therefore, the link overlay controller has a set of active link icons and active file attachment icons that the user can select from to ensure the closest match between the active file attachment icon and an attachment image in screen capture 400. The link overlay controller in this example, is a software component such as link overlay controller 308 in FIG. 3.

If a user selects an active file attachment icon, such as active file attachment icon 402, a link overlay controller, such as link overlay controller 308 in FIG. 3, retrieves and displays a document corresponding to active file attachment icon 402. If a user selects an inactive file attachment image, such as inactive file attachment image 416, a document will not be displayed because inactive file attachment images 410-416 are not functional, accessible, or active file attachments.

Screen capture 400 with active file attachment icons 402-408 can be saved as a screen capture with active links, such as active link screen captures 310 in FIG. 3. In another embodiment, active file attachment icons 402-408 can be removed from screen capture 400 before screen capture 400 is saved to a data storage device and/or sent to a recipient. In this example, a user selects an option to remove file attachment overlays and/or link overlays from screen capture 400 before saving or sending screen capture 400. An option to remove file attachment overlays and link overlays can be provided in a link overlay menu, such as link overlay menu 502 shown in FIG. 5, as described below.

Figure 5:
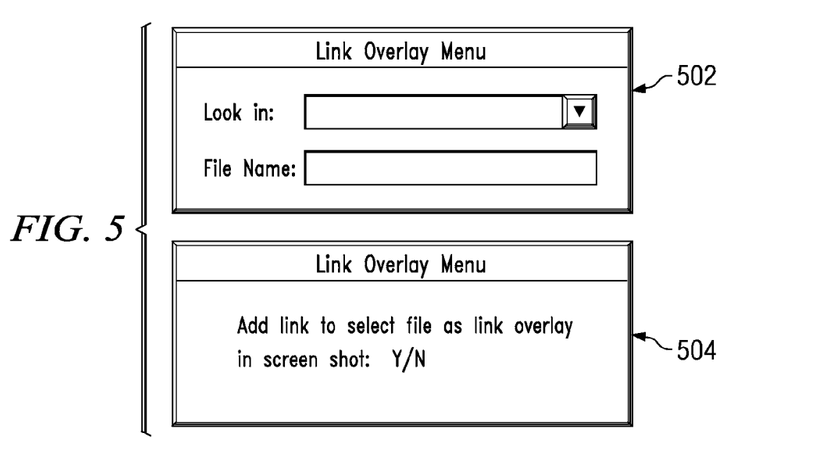
FIG. 5 is a block diagram of a link overlay menu in accordance with an illustrative embodiment.

FIG. 5 is a block diagram of a link overlay menu in accordance with an illustrative embodiment. Link overlay menu 502 provides a user with the option to enter a file name for a document to be attached as a file attachment overlay and/or enter an active hyperlink web address for a web page to be added to a screen capture as an active link overlay. Link overlay menu 504 provides a user with an option to select to add a link overlay and/or a file attachment overlay to the screen capture.

In another embodiment, link overlay menu 502 provides an option to remove a link overlay and/or a file attachment overlay. A user can select a link overlay or a file attachment overlay for removal from a screen capture. A user may choose to remove a link overlay or a file attachment overlay if data storage space for storing the screen capture is limited. In addition, a user may wish to remove one or more link overlays and/or file attachment overlays before sending the screen capture to a particular recipient.

The link overlay menu shown in FIG. 5 is an illustrative example of one possible implementation for a link overlay menu. However, FIG. 5 is not intended to limit a link overlay menu to the layout, format, options, or look of link overlay menus 502-504. A link overlay menu in accordance with the illustrative embodiments can b presented to a user in any layout, format, options, look, or design for presenting link overlay options to a user for generating and embedding active link overlays and file attachment overlays to a screen capture.

Figure 6:
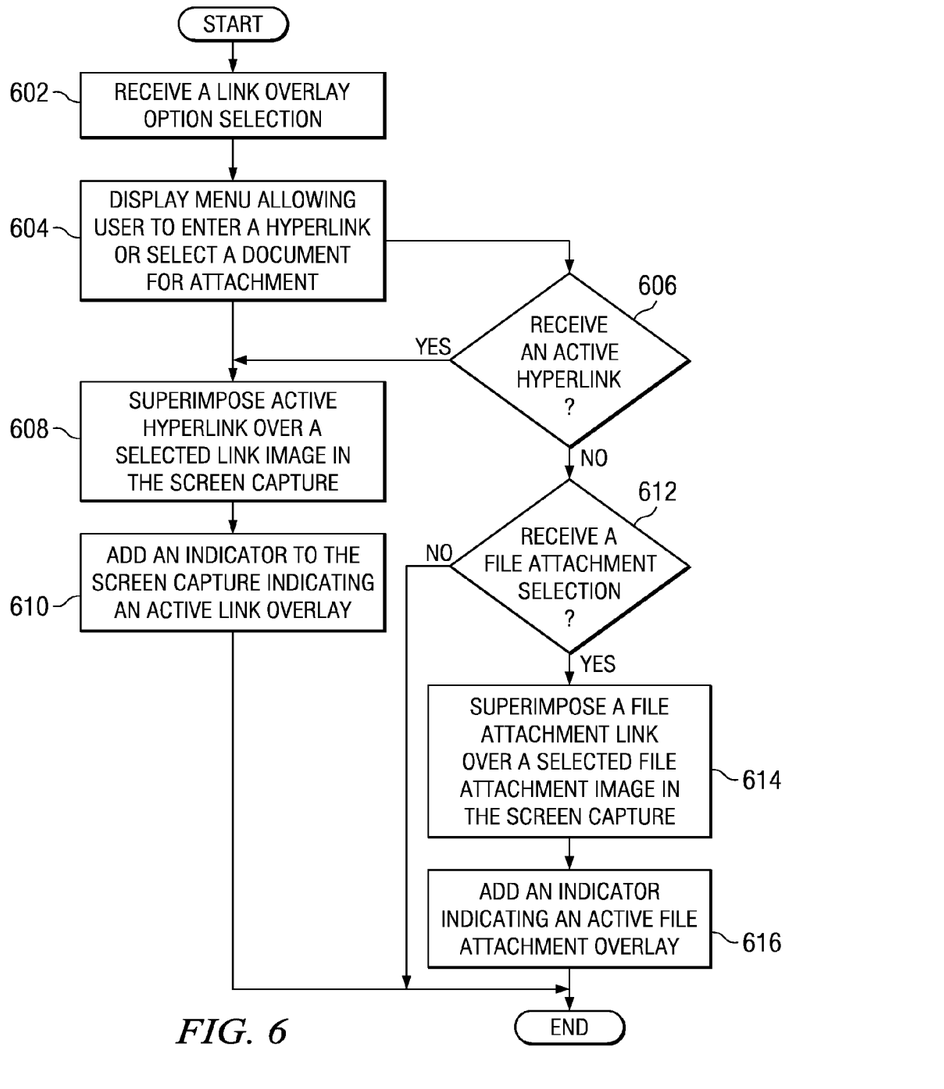
FIG. 6 is a flowchart illustrating a process for generating a link overlay in accordance with an illustrative embodiment.

FIG. 6 is a flowchart illustrating a process for generating a link overlay in accordance with an illustrative embodiment. In this illustrative example shown in FIG. 6, the process is performed by a software component for creating a link overlay in a screen capture, such as link overlay controller 308 in FIG. 3.

The process begins by receiving a link overlay option selection (step 602) form a user. A user can select a link overlay option by selecting or highlighting a link image in a screen capture, entering a command to create a link overlay, selecting a menu option to create a link overlay, and/or any other known or available method for a user to indicate a desire to create a link overlay.

Next, the process displays a link overlay menu allowing a user to enter an active hyperlink or select a document for attachment (step 604) to the screen capture. The process makes a determination as to whether an active hyperlink is received from the user (step 606). Responsive to receiving an active hyperlink, the process superimposes the active hyperlink over the selected screen capture link image (step 608) to form a link overlay in the screen capture. The process adds an indicator to the selected screen capture indicating an active link overlay (step 610) with the process terminating thereafter. In this example, the indicator is an active link overlay icon.

Returning now to step 606, if the process does not receive an active hyperlink, the process makes a determination as to whether a selection of a file attachment is received (step 612). A file attachment is selected by any means known or available for a user to indicate or select a file or document for attachment. If a file attachment is not selected by the user, the process terminates thereafter.

Returning to step 612, if a file attachment is selected, the process superimposes a file attachment link over a selected file attachment image in the screen capture (step 614) to form a file attachment overlay. The process adds an indicator to the file attachment image indicating an active file attachment overlay (step 616) with the process terminating thereafter. In this example, an indicator to indicate an active file attachment overlay is an active file attachment icon.

Figure 7:
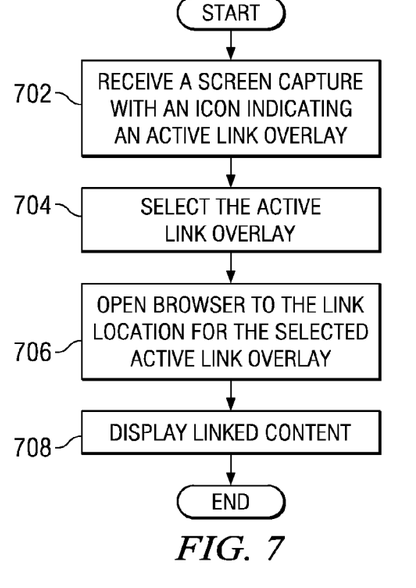
FIG. 7 is a flowchart illustrating a process for utilizing a link overlay to retrieve and display linked content in accordance with an illustrative embodiment.

FIG. 7 is a flowchart illustrating a process for utilizing a link overlay to retrieve and display linked content in accordance with an illustrative embodiment. In this illustrative example shown in FIG. 7, the process is performed by a software component for displaying a linked page or document corresponding to a selected link overlay in a screen capture, such as a web browser, word application, email application, or other application for retrieving and displaying documents, such as application 306 in FIG. 3.

The process begins by receiving a screen capture with an icon indicating an active link overlay (step 702). The process selects the active link overlay (step 704). The process opens a web browser to the link location of the selected active link overlay to retrieve linked content (step 706). Next, the process displays the linked content (step 708) on a display screen with the process terminating thereafter.

In this illustrative example, the link overlay is a hyperlink to a web page and a web browser is utilized to retrieve and display the linked content. However, the link overlay can also include an active file attachment link to a document. In this example, any appropriate application, such as a document reader or media player can be used to retrieve the attached document and display the attached document content to a user.

Figure 8:
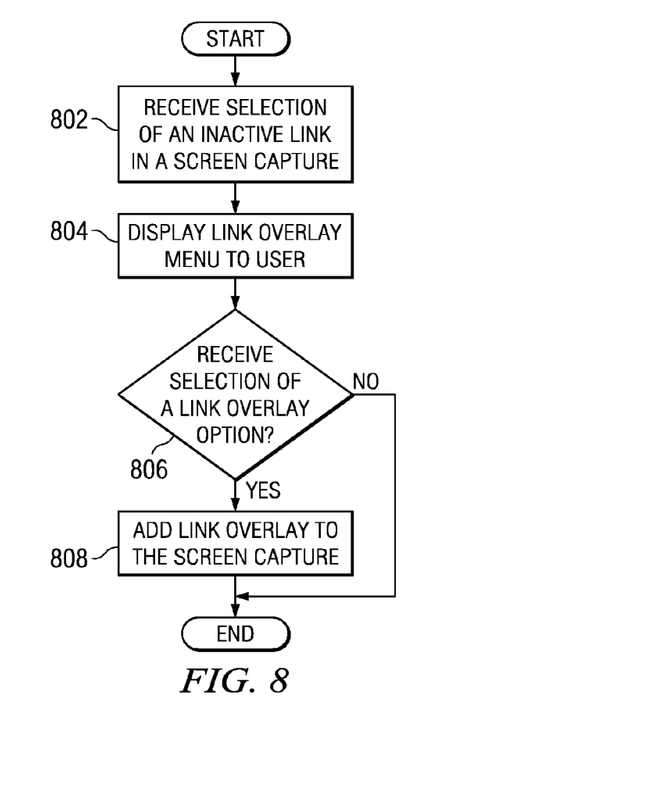
FIG. 8 is a flowchart illustrating a process for presenting a link overlay menu to a user for selection of a link overlay in accordance with an illustrative embodiment.

FIG. 8 is a flowchart illustrating a process for presenting a link overlay menu to a user for selection of a link overlay in accordance with an illustrative embodiment. In this illustrative example shown in FIG. 8, the process is performed by a software component for creating a link overlay in a screen capture, such as link overlay controller 308 in FIG. 3.

The process begins by receiving a selection of an inactive link image in a screen capture (step 802) indicating a desire to create a link overlay for the selected link image. The process displays a link overlay menu to the user (step 804). The process makes a determination as to whether a selection of a link overlay option is received (step 806). A link overlay option includes an option to create either a link overlay for an active hyperlink and/or a file attachment overlay for a document attachment. For example, a user can select a link overlay option by entering an active hyperlink to create a link overlay and/or selecting a document for attachment to create a file attachment overlay. If a selection of a link overlay option is not received, the process terminates thereafter. If the link overlay option is selected, the process adds a link overlay to the screen capture (step 808) with the process terminating thereafter.

Thus, the illustrative embodiments provide a computer implemented method, apparatus, and computer usable program code for accessing information in screen captures. The process copies an image displayed on a display to form a screen capture. Next, the process receives a selection of an attachment image in the screen capture. Finally, the process links a document to the attachment image to form a file attachment overlay. The file attachment overlay is superimposed over the attachment image in the screen capture.

In another embodiment, the process receives a selection of a link image in the screen capture. The process adds an active hyperlink to the screen capture to form a link overlay, wherein the link overlay is an active hyperlink that overlays the link image in the screen capture. Thus, the illustrative embodiments allow a user to add active hyperlinks to a screen capture. The user can conveniently follow the link to a web page or attached document by selecting the link overlay in the screen capture.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for accessing information in screen captures, the computer implemented method comprising:
   copying an image displayed on a display to form a screen capture;
   receiving a selection of an attachment image in the screen capture;
   responsive to receiving the selection of the attachment image in the screen capture, displaying a menu including a list of a plurality of documents; and
   responsive to receiving a selection of a document from the plurality of documents, linking, by a processing unit, the document to the attachment image to form a file attachment overlay in the screen capture.

2. The computer implemented method of claim 1 further comprising:

responsive to receiving a selection of the file attachment overlay in the screen capture, displaying the document.

3. The computer implemented method of claim 1 wherein the file attachment overlay is an active hyperlink that is superimposed over the attachment image in the screen capture.

4. The computer implemented method of claim 3 further comprising:
responsive to receiving a selection of the file attachment overlay at a client, retrieving a linked web page corresponding to the active hyperlink; and
displaying the linked web page in a web browser on the client.

5. The computer implemented method of claim 1 further comprising:
generating an active file attachment icon in the screen capture to represent the file attachment overlay.

6. The computer implemented method of claim 1 wherein the active file attachment icon includes a different visual characteristic than the attachment image to distinguish the active file attachment icon for the file attachment overlay from an inactive attachment image, and wherein the different visual characteristic includes at least one of a color, a shape, a flag, a border, a symbol, a size, a set of dimensions, and a thumbnail.

7. The computer implemented method of claim 1 further comprising:
sending the screen capture with the file attachment overlay to a recipient by means of an email application.

8. The computer implemented method of claim 1 further comprising:
embedding the file attachment overlay directly into a body of an email message.

9. The computer implemented method of claim 1 wherein the file attachment overlay is an active and accessible file attachment link, wherein a user can view the document by selecting the file attachment overlay.

10. The computer implemented method of claim 1 wherein the file attachment overlay is superimposed over the attachment image in the screen capture.

11. The computer implemented method of claim 1 further comprising:
displaying information regarding the document on the display, wherein the information includes at least one of a document size, a date the document was created, a time the document was created, and a user that created the document.

12. A computer implemented method for link activation in screen captures, the computer implemented method comprising:
copying an image displayed on a display to form a screen capture;
receiving a selection of a link image in the screen capture;
responsive to receiving the selection of the link image in the screen capture, displaying a menu for receiving an active hyperlink; and
responsive to receiving the active hyperlink, adding, by a processing unit, the active hyperlink to the screen capture to form a link overlay in the screen capture.

13. The computer implemented method of claim 12 further comprising:
wherein the link overlay is an active hyperlink that overlays the link image in the screen capture.

14. The computer implemented method of claim 12 further comprising:
responsive to receiving a selection of the link overlay in the screen capture, displaying a linked web page in a web browser on the client.

15. The computer implemented method of claim 12 wherein the link is a link to an attached document.

16. The computer implemented method of claim 15 further comprising:
responsive to receiving a selection of the link overlay in the screen capture, displaying the attached document.

17. The computer implemented method of claim 12 further comprising:
generating an active link icon in the screen capture to represent the link overlay.

18. A computer program product comprising:
a computer readable storage medium including computer usable program code for accessing information in screen captures, said computer program product comprising:
computer usable program code for copying an image displayed on a display to form a screen capture;
computer usable program code for receiving a selection of an attachment image in the screen capture;
computer usable program code for displaying a menu including a list of a plurality of documents, in response to receiving the selection of the attachment image in the screen capture; and
computer usable program code for linking the document to the attachment image to form a file attachment overlay in the screen capture, in response to receiving a selection of a document from the plurality of documents.

19. The computer program product of claim 18 further comprising:
computer usable program code for displaying the document in response to receiving a selection of the file attachment overlay in the screen capture.

20. The computer program product of claim 18 wherein the attachment image is an image of a hyperlink, and wherein the file attachment overlay is an active hyperlink that overlays the image of the hyperlink.

21. The computer program product of claim 20 further comprising:
computer usable program code for retrieving a linked web page corresponding to the active hyperlink and displaying the linked web page in a web browser on the client in response to receiving a selection of the file attachment overlay.

22. The computer program product of claim 18 further comprising:
computer usable program code for generating an active file attachment icon in the screen capture to represent the file attachment overlay.

23. The computer program product of claim 18 wherein the active file attachment icon includes a different visual characteristic than the attachment image to distinguish the active file attachment icon for the file attachment overlay from an inactive attachment image, and wherein the different visual characteristic includes at least one of a color, a shape, a flag, a border, a symbol, a size, a set of dimensions, and a thumbnail.

24. The computer program product of claim 18 wherein the file attachment overlay is superimposed over the attachment image in the screen capture.

25. An apparatus comprising:
a bus system;
a communications system connected to the bus system;
a memory connected to the bus system, wherein the memory includes computer usable program code; and
a processing unit connected to the bus system, wherein the processing unit executes the computer usable program code to copy an image displayed on a display to form a screen capture; receive a selection of an attachment image in the screen capture; display a menu including a list of a plurality of documents, in response to receiving the selection of the attachment image in the screen capture; and link the document to the attachment image to form a file attachment overlay in the screen capture, in response to receiving a selection of a document from the plurality of documents.

26. The apparatus of claim 25 wherein the processor unit further executes the computer usable program code to display the document in response to receiving a selection of the file attachment overlay in the screen capture.

27. The apparatus of claim 25 wherein the attachment image is an image of a hyperlink and wherein the file attachment overlay is an active hyperlink that overlays the image of the hyperlink.

28. The apparatus of claim 27 wherein the processor unit further executes the computer usable program code to retrieve a linked web page corresponding to the active hyperlink and display the linked web page in a web browser on the client in response to receiving a selection of the file attachment overlay at a client.

29. The apparatus of claim 25 wherein the processor unit further executes the computer usable program code to generate an active file attachment icon in the screen capture to represent the file attachment overlay.

30. The apparatus of claim 25 wherein the file attachment overlay is superimposed over the attachment image in the screen capture.

31. An apparatus comprising:
a bus system;
a communications system connected to the bus system;
a memory connected to the bus system, wherein the memory includes computer usable program code; and
a processing unit connected to the bus system, wherein the processing unit executes the computer usable program code to copy an image displayed on a display to form a screen capture; receive a selection of a link image in the screen capture; display a menu for receiving an active hyperlink, in response to receiving the selection of the link image in the screen capture; and add the active hyperlink to the screen capture to form a link overlay in the screen capture in response to receiving the active hyperlink.

32. The apparatus of claim 31 wherein the processor unit further executes the computer usable program code to display a linked web page in a web browser on the client in response to receiving a selection of the link overlay in the screen capture at a client.

33. The apparatus of claim 31 wherein the link is a link to an attached document.

34. The apparatus of claim 31 wherein the processor unit further executes the computer usable program code to display the attached document in response to receiving a selection of the link overlay in the screen capture.

35. The apparatus of claim 31 wherein the link overlay is an active hyperlink that overlays the link image in the screen capture.

* * * * *